US011190253B2

(12) United States Patent
Jamin et al.

(10) Patent No.: US 11,190,253 B2
(45) Date of Patent: Nov. 30, 2021

(54) METHOD AND APPARATUS FOR INTERFERENCE MITIGATION FOR A MU-MIMO WIRELESS COMMUNICATION NETWORK

(71) Applicant: Cambium Networks Ltd, Devon (GB)

(72) Inventors: Antony Jamin, Devon (GB); Nigel King, Devon (GB); Andrew Rimmer, Devon (GB); Peter Strong, Devon (GB)

(73) Assignee: CAMBIUM NETWORKS LTD, Devon (GB)

( * ) Notice: Subject to any disclaimer, the term of this patent is extended or adjusted under 35 U.S.C. 154(b) by 0 days.

(21) Appl. No.: 17/099,475

(22) Filed: Nov. 16, 2020

(65) Prior Publication Data

US 2021/0075484 A1    Mar. 11, 2021

Related U.S. Application Data

(63) Continuation of application No. PCT/GB2019/051350, filed on May 16, 2019.

(30) Foreign Application Priority Data

May 18, 2018    (GB) ..................................... 1808138

(51) Int. Cl.
*H04B 7/06* (2006.01)
*H04B 7/0452* (2017.01)
*H04B 7/0456* (2017.01)

(52) U.S. Cl.
CPC ......... *H04B 7/0617* (2013.01); *H04B 7/0452* (2013.01); *H04B 7/0456* (2013.01)

(58) Field of Classification Search
CPC .... H04B 7/0452; H04B 7/0456; H04B 7/086; H04B 7/088; H04L 1/203; H04L 1/0048
See application file for complete search history.

(56) References Cited

U.S. PATENT DOCUMENTS 10,530,548 B2 * 1/2020 Xia ....................... H04L 5/0051
2010/0215112 A1  8/2010 Tsai et al.
(Continued)

FOREIGN PATENT DOCUMENTS

GB    2573817 A    11/2019
WO    WO 2018/054459 A1    3/2018
WO    WO 2019/220126 A1    11/2019

OTHER PUBLICATIONS

International Search Report and Written Opinion from corresponding PCT/GB2019/051350 dated Sep. 12, 2019 (16 pages).

(Continued)

*Primary Examiner* — Nineeta S Panwalkar
(74) *Attorney, Agent, or Firm* — Crowell & Moring LLP

(57) ABSTRACT

Interference mitigation for a MU-MIMO wireless communication network includes determining a MU-MIMO group of further wireless stations to which respective beams are to be formed, forming a first beam for reception of transmitted data from a second wireless station based on previously determined channel estimates. When the MU-MIMO group has fewer members than a number of beams which a beamforming weights matrix is configured to receive, forming an additional beam(s) being offset in angle of arrival by a respective predetermined angle from the first beam for reception of the transmitted data from the second wireless station, and generating a decoded data stream from a data stream resulting from receipt of the transmitted data in the first beam and from respective data streams resulting from receipt of the transmitted data from the additional beam(s).

20 Claims, 14 Drawing Sheets

(56) References Cited

U.S. PATENT DOCUMENTS

| | | | |
|---|---|---|---|
| 2011/0205913 A1 | 8/2011 | Van Zelst et al. | |
| 2017/0230095 A1 | 8/2017 | Kim et al. | |
| 2018/0102827 A1 | 4/2018 | Noh et al. | |
| 2020/0059290 A1* | 2/2020 | Pan | H04B 17/327 |

OTHER PUBLICATIONS

Combined Search and Examination Report issued in corresponding GB 1808138.0 dated Oct. 16, 2018 (5 pages).

Q. Xue, X. Fang and M. Xiao, "Beam Management for Millimeter Wave Beamspace MU-MIMO Systems," 2017 IEEE/CIC International Conference on Communications in China (ICCC), Qingdao, 2017, pp. 1-6.

* cited by examiner

METHOD AND APPARATUS FOR INTERFERENCE MITIGATION FOR A MU-MIMO WIRELESS COMMUNICATION NETWORK

CROSS-REFERENCE TO RELATED APPLICATIONS

This application is a continuation of International Patent Application No. PCT/GB2019/051350, filed May 16, 2019, designating the United States and published in English as WO 2019/220126 A1 on Nov. 21, 2019, which claims priority from GB Application No. 1808138.0, filed on May 18, 2018, the entirety of each of which are both hereby fully incorporated by reference.

TECHNICAL FIELD

The present invention relates generally to interference mitigation in a multi user multiple input multiple output (MU-MIMO) wireless communication network comprising a plurality of wireless stations and particularly, but not exclusively, to a method of interference mitigation by forming a first receive beam and additional receive beams and selecting between the outputs of the beams to mitigate for the effects of interference.

BACKGROUND

Modern wireless communication networks are typically placed under great demands to provide high data capacity within the constraints of the allocated signal frequency spectrum. In cellular wireless communication networks, capacity may be increased by re-using frequencies between cells, typically according to a predetermined frequency re-use pattern. A fixed wireless access system may comprise a base station, which may be referred to as an access point, typically mounted on an antenna tower, and a number of subscriber modules installed at customer premises. The area of coverage of an access point may be divided into sectors, each sector being used to transmit and receive with a respective cell. Capacity may be further increased within a cell by steering respective beams towards specific user equipments, which may be referred to as subscriber modules, to allow communication between the access point with improved gain and/or reduced interference reception in comparison with a beam covering a sector. The access point may be equipped with an antenna array and a beamformer for each sector, for forming beams for communication with each respective subscriber module. Capacity may be increased still further by employing Multi-User Multiple Input Multiple Output (MU-MIMO) beamforming, in which respective beams may be simultaneously directed at different subscriber modules selected for a MU-MIMO group, each beam carrying different data. The subscriber modules selected for membership of a MU-MIMO group have sufficient spatial separation that each beam may be directed at one member of the group, while a null is steered to the other members of the group, to avoid interference between members of the group. Alternatively, a peer-to-peer mesh network may be provided. In this case, there may be a plurality of wireless stations which are not differentiated into specific access points and subscriber modules, each station being able to communicate with several others using MU-MIMO beams.

A set of MU-MIMO beams may be formed by applying a beamforming weightset to a weighting matrix. The weighting matrix forms a number of output signals, by applying appropriate amplitude and phase weights to an element signal received from each element of an antenna array, in order to form the respective MU-MIMO beam to receive the respective signals from the respective subscriber modules or other wireless stations. The beamforming weightset may be calculated on the basis of channel estimates, which relate to the amplitude and phase characteristic of the radio frequency propagation path through each receive chain, and each element of the antenna at the access point or first wireless station, from each subscriber unit or other wireless station. The channel estimates may be calculated on the basis of sounding symbols having pre-determined phase and amplitude characteristics.

However, the wireless communication network may be subject to interference, in particular if an unlicensed band is being used in which other wireless systems may operate. The interference may be intermittent, and may not be present when a sounding symbol is received, and so it may difficult to take into account the effects of interference when calculating a beamforming weightset. In particular, the interference may change dynamically from symbol to symbol, whereas updating of a MU-MIMO weightset may be performed in a much longer timescale, typically seconds or minutes, and updating a weightset frequently may lead to a heavy signalling overhead for channel sounding.

It is an object of the invention to mitigate the problems of the prior art.

SUMMARY

In accordance with a first aspect of the invention there is provided a method of interference mitigation for a multi user multiple input multiple output MU-MIMO wireless communication network comprising a first wireless station and a plurality of further wireless stations, comprising:

determining a MU-MIMO group of the further wireless stations to which respective beams are to be formed to allow simultaneous reception of respective transmitted data from respective further wireless stations in the MU-MIMO group at the first wireless station;

forming a first beam for reception of transmitted data from a second wireless station, the second wireless station being one of the further wireless stations in the MU-MIMO group, on the basis of previously determined channel estimates;

dependent on a determination that the MU-MIMO group has fewer members than a number of beams which a beamforming weights matrix is configured to receive, forming one or more additional beams, within the capacity of the beamforming weights matrix, for reception of the transmitted data from the second wireless station, the additional beams each being offset in angle of arrival by a respective pre-determined angle from the first beam; and generating a decoded data stream from a data stream resulting from receipt of the transmitted data in the first beam and from respective data streams resulting from receipt of the transmitted data in the one or more additional beams.

The generation of additional beams offset from the first beam provides a variety of positions of nulls in the reception patterns, and so increases the probability of an interference source falling into a null on at least one of the beams. Generating the decoded data stream from the data streams from the first beam and the additional beams allows data to be selected from the stream with the best rejection of interference, which may change dynamically due to multiple sources of intermittent interference. Selection between beams may be performed more rapidly and with less signalling overhead than recalculation of a weightset to adjust a beam pattern.

The first wireless station may be an access point and the further wireless stations may be subscriber modules in a MU-MIMO wireless communication network. Alternatively, the first wireless station and the further wireless stations may be peers in a peer-to-peer mesh MU-MIMO wireless communication network.

In an embodiment of the invention, generating the decoded data stream comprises:

demodulating and applying forward error correction to each of the data streams; and generating the decoded data stream by combining sections of the respective data streams selected on the basis of the forward error correction of the respective data stream.

This provides an efficient method of selecting which data to include in the decoded data stream.

In an embodiment of the invention, generating the decoded data stream comprises combining sections of respective data streams by selecting data from sections determined not to have uncorrected errors.

This provides an efficient method of combining the data stream. Data determined not to have uncorrected errors may be taken from any of the data streams, so selection of which data to include is straightforward.

In an embodiment of the invention, selecting data determined not to have uncorrected errors comprises selecting OFDM symbols determined not to have uncorrected errors.

This allows symbol-by-symbol selection of reception from different beams, allowing agile adaption to multiple intermittent interference sources which may fall in nulls of different beams.

In an embodiment of the invention, the method comprises:

generating a combined demodulated data stream from the data streams;

applying forward error correction to the combined demodulated data stream; and generating the decoded data stream on the basis of the forward error correction of the data stream received in the first beam, the forward error correction of the data streams received in the one or more beams, and the forward error correction of the combined demodulated data stream.

Generating a combined demodulated data stream provides a further source of demodulated data form which decoded data may be selected, which may provide better interference rejection than the additional beam alone, for example if an interference source falls between nulls of the additional beams or if the noise source is distributed in origin in azimuth angle.

In an embodiment of the invention, generating the combined demodulated data stream comprises:

selecting each bit of the combined demodulated data stream by comparison of the corresponding bit of each of the data steams to be combined.

This allows selection bits to be selected from different streams on a bit-by-bit basis. Each bit may be related to a respective sub-carrier of an OFDM symbol, at a different frequency, and so the origin of the interference may vary between bits, so this allows selection of a different reception pattern per bit to reject the respective interference.

In an embodiment of the invention, selecting each bit of the combined data stream comprises selecting a majority value for each bit of the values of the corresponding bits of each of the data steams to be combined.

This allows an efficient method of selecting bits.

In an embodiment of the invention, generating the combined demodulated data stream comprises:

weighting the respective corresponding bits of each of the data steams to be combined according to a respective quality metric.

This allows effective combination of the data streams.

In an embodiment of the invention, the quality metric comprises a forward error correction error rate for the respective stream and/or a per tone vector error calculation.

This may provide improved performance by allowing optimal combination of the streams, which may be effective even if the errored demodulator changes from data point to data point.

In an embodiment of the invention, the method comprises iteratively adjusting the offset in angle of arrival of a selected one of the additional beams away from the respective predetermined angle on the basis of a measure of quality of the data stream received in the selected beam.

This may provide a further improvement by allowing adjustment of the position of the nulls of one or more of the additional beams to better coincide with the long-term position of an interference source. The measure of quality of the data stream received in the selected beam may comprise an aggregate vector error for a received symbol, or for example an error rate from a forward error correction decoder. The angle of arrival may be in azimuth and/or elevation.

In an embodiment of the invention, the selected beam is a beam selected on the basis of having a low measure of quality of the data stream received in the beam when offset from the first beam by the respective predetermined angle.

This allows the beam with the worst rejection of interference to be iteratively adjusted to a position with better rejection of interference.

In an embodiment of the invention, the first beam and each additional beam have respective sinc beam shapes.

This provides a convenient implementation.

In an embodiment of the invention, the first beam has a beam shape having different side lobe levels from the side lobe levels of the respective beam shapes of the additional beams.

This may allow improved interference rejection at some angles of arrival.

In an embodiment of the invention, at least one of the additional beams has lower gain in the first sidelobes than the gain of the corresponding sidelobes in a sinc beam shape.

This may allow improved rejection of interference at angles of arrival between nulls in the beams.

In an embodiment of the invention, the first wireless station is an access point and the further wireless stations are subscriber modules in a MU-MIMO wireless communication network.

This may allow further improved rejection of interference at angles of arrival between nulls in the beams.

In accordance with a second aspect of the invention there is provided a first wireless station for a multi user multiple input multiple output MU-MIMO wireless communication network comprising the first wireless station and a plurality of further wireless stations, the first wireless station comprising a processor configured to cause the first wireless station to:

determine a MU-MIMO group consisting of further wireless stations to which respective beams are to be formed to allow simultaneous reception of respective data streams from respective further wireless stations at the first wireless station;

cause a beamforming weights matrix to form a first beam for reception of a data stream from a second wireless station, the second wireless station being one of the further wireless stations in the MU-MIMO group, on the basis of previously determined channel estimates;

dependent on a determination that the MU-MIMO group has fewer members than a number of beams which a beamforming weights matrix is configured to receive, to cause a beamforming weights matrix to form one or more additional beams for reception of the transmitted data from the second wireless station, the additional beams each being offset in angle of arrival by a respective pre-determined angle from the first beam; and to generate a decoded data stream from a data stream resulting from receipt of the transmitted data in the first beam and from respective data streams resulting from receipt of the transmitted data in the one or more additional beams.

Further features of the invention will be apparent from the following description of preferred embodiments of the invention, which are given by way of example only.

DETAILED DESCRIPTION

By way of example, embodiments of the invention will now be described in the context of a fixed wireless access system operating a time division duplex system based on IEEE 802.11 standards at carrier frequencies typically between 5 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands. In the context of the fixed wireless access system described, the system comprises what are referred to as "access points" and "subscriber modules". However, embodiments are not limited to applications in which access points and subscriber modules are provided. For example, a peer-to-peer mesh network may be provided. In this case, there may be a plurality of wireless stations which are not differentiated into specific access points and subscriber modules, each station being able to communicate with several others using MU-MIMO beams. So, references to "access point" may be interpreted as references to a "first wireless stations", and references to a "subscriber module" or "subscriber modules" may be interpreted as references to a "further wireless station" or "further wires stations" respectively.

Figure 1:
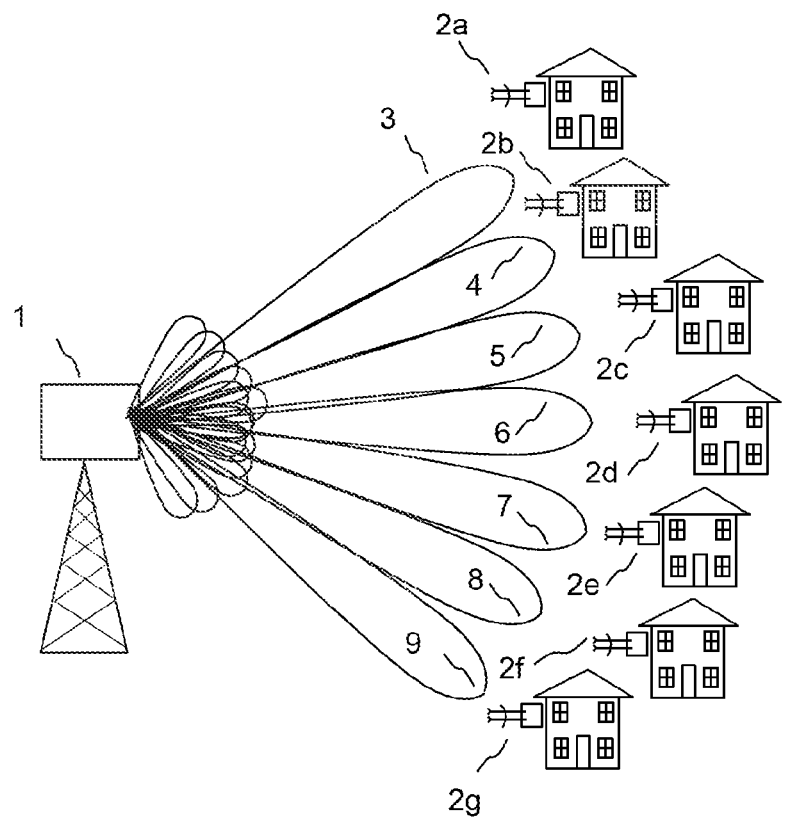
FIG. 1 is a schematic diagram showing reception of respective MU-MIMO beams at an access point from subscriber modules which are members of a MU-MIMO group, where the number of members of the MU-MIMO group is the same as the number of MU-MIMO beams available.

FIG. 1 is a schematic diagram showing an access point 1 according to an embodiment of the invention in a multi user multiple input multiple output (MU-MIMO) point to multipoint wireless communication network comprising the access point and subscriber modules 2a-2g. In a peer-to-peer mesh network, a first wireless station 1 and further wireless stations 2a-2g would be provided. In the illustrated example, the access point is mounted on a tower, and the subscriber modules are fixed to buildings, for example to provide a data service such as internet access to homes and businesses. The access point 1 has an array of antenna elements, each element being arranged to receive, and/or transmit, signals that are appropriately weighted in amplitude and phase to form, in this example, seven MU-MIMO beams 3-9 in a MU-MIMO mode of operation. In a data reception mode, a respective beam is formed for each of multiple data streams using a beamforming weights matrix. So, for example, different payload data may be received simultaneously from each subscriber module 2a-2g. Each beam is typically arranged to form a null in the direction of the other beams, so reducing interference from the other subscriber units. The appropriately weighted signals from each antenna element are combined by superposition in the beamforming matrix to form a combined weighted signal for reception from each subscriber module. Signals may be separately combined to form a beam at each polarisation. In FIG. 1, beams at only one polarisation are shown for clarity, which may be, for example, vertical polarisation, V, but a further set of beams at a second orthogonal polarisation may also be formed, for example horizontal polarisation, H. Furthermore, polarisation may be controlled in a beam by appropriate weighting of signals for antenna elements at different polarisations, so that beams may be formed at two polarisations orthogonal to each other, but not purely of polarisations corresponding to those of the elements of the antenna. Also, in the examples illustrated, the beams are shown as being formed in azimuth, but references to "azimuth" may be interpreted to cover azimuth and/or elevation, that is to say angle of arrival.

The subscriber modules 2a-2g shown in FIG. 1 may be subscriber modules which have been selected for membership of a MU-MIMO group on the basis that they have sufficient spatial separation that each beam may be directed at one member of the group, while a null may be steered to the other members of the group, to avoid interference between members of a group. Selection for membership of the MU-MIMO group also be on the grounds that a subscriber module has data to send, and the selection may be on a temporary basis, and may for example be per symbol.

In the case of FIG. 1, there are as many members of the MU-MIMO group as the maximum number of beams that the system is configured to form. In this case there is no spare capacity in terms of numbers of beams, because there is a subscriber module active in each of the orthogonal MU-MIMO beams. The maximum number of beams that may be formed may be limited by the number of demodulator channels provided, and by the number of weights in the beamforming weights matrix. The maximum number of orthogonal MU-MIMO beams that may be formed may be limited by the angular separation of nulls in the array, because each beam typically falls in a null of the other beams. This in turn may be limited by the number of elements in the antenna array. The hardware provision, as regards number of beams, that may be formed simultaneously is typically arranged to correspond to the number of MU-MIMO beams that may be formed.

Figure 2:
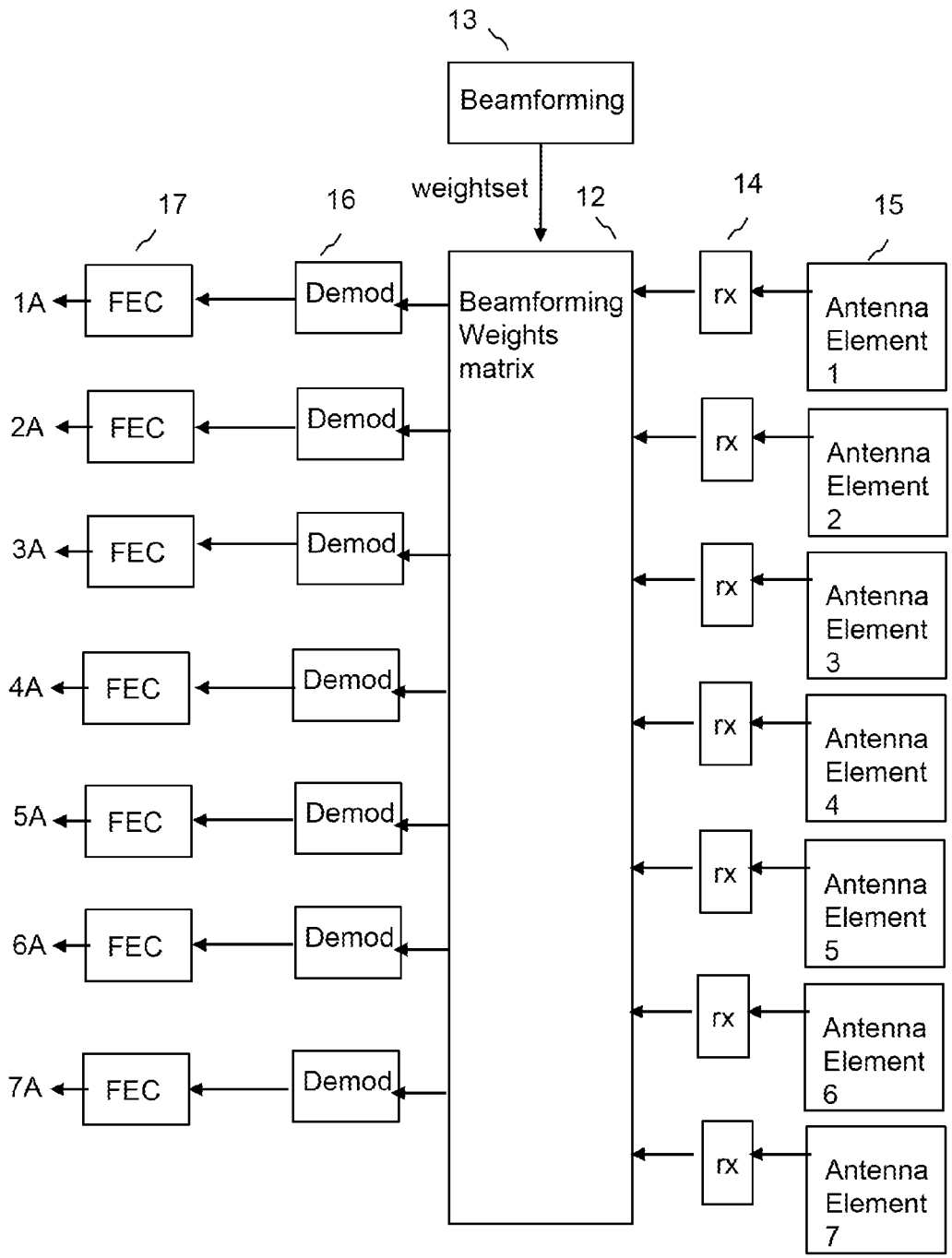
FIG. 2 is a schematic diagram showing a reception architecture for an access point having a beamforming weights matrix for simultaneous reception of multiple MU-MIMO beams.

FIG. 2 is a schematic diagram showing an architecture for the reception of MU-MIMO beams at the access point. An array of antenna elements 15, typically patch antenna elements, receives transmissions from subscriber modules in MU-MIMO group. The received signals are passed to receiver chains, 14, which downconvert the received signals from radio frequency (RF) to, typically, baseband and convert the signals to the digital domain. The architecture may be used to receive payload data using MU-MIMO beams in a data transmission mode in which payload data is mapped from received Orthogonal Frequency Division Multiplexing (OFDM) tones to the beamforming weights matrix 12 for the forming of MU-MIMO beams. An OFDM tone value is a representation of an amplitude and phase of a tone, also referred to as a subcarrier, for an OFDM symbol. This may be typically a vector having an Inphase and Quadrature value. Data may be encoded in the tone value using QAM (Quadrature Amplitude Modulation) modulation. After beamforming, the tone vectors are typically demodulated in a modulator 16 to convert to a binary stream, and then forward error correction (FEC) decoding is applied to detect and correct errors in the binary stream, typically on a symbol-by-symbol basis.

Figure 3:
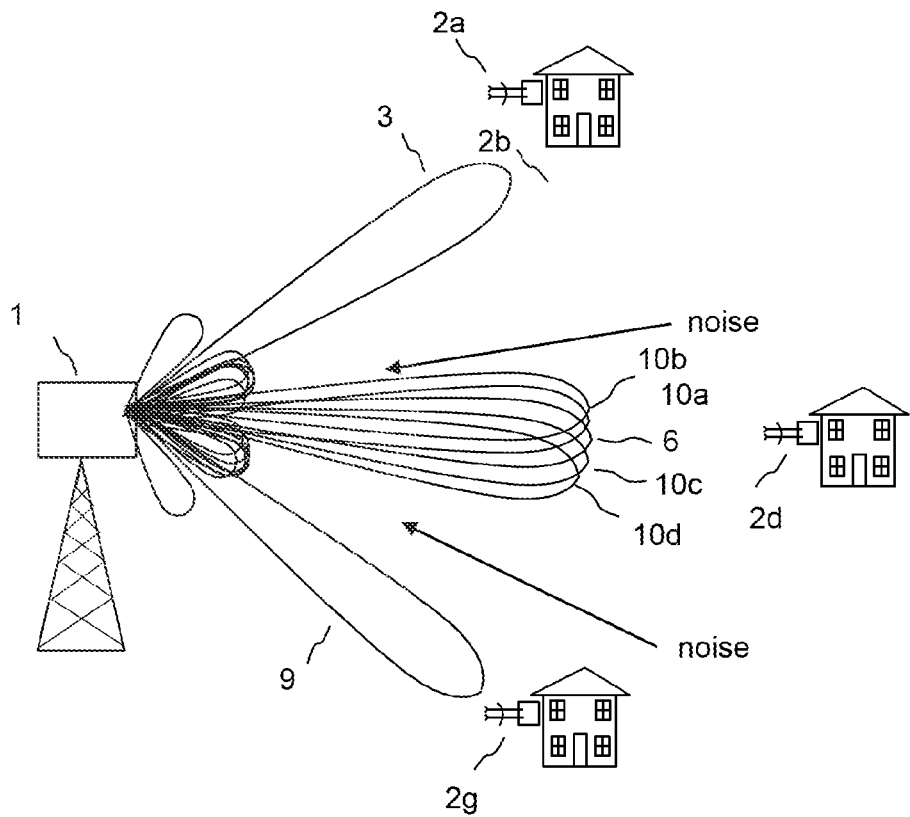
FIG. 3 is a schematic diagram showing reception of respective beams at an access point from subscriber modules which are members of a MU-MIMO group, where the number of members of the MU-MIMO group is less than the number of MU-MIMO beams available, and several closely-spaced additional beams are formed to a subscriber module, which is subject to interference from noise sources which may be intermittent.

FIG. 3 shows the case, in an embodiment of the invention, in which the number of members of the MU-MIMO group is less than the number of MU-MIMO beams available. The number of MU-MIMO beams available depends on the capacity of the access point, or wireless station, to form beams. The capacity may be limited by the architecture of the beamforming weights matrix and/or the number of demodulation and error correction channels at the output of the beamforming weights matrix. The spare capacity for beamforming is used to form several closely-spaced additional beams to a subscriber module, which is subject to interference from noise sources which may be intermittent. The additional beams may have slightly lower gain towards the subscriber module than the first beam, which was formed as a MU-MIMO beam on the basis of channel sounding data. This is because the peaks of the additional beams are slightly offset from direction of the subscriber module. However, the nulls in the reception patterns of the additional beams are also offset from the nulls of the first beam and from each other. Accordingly, by selection of data from one or other of the beams, it may be possible to improve rejection of interference by taking data from a beam in which the intermittent interference falls within a null at the time of reception.

As shown in FIG. 3, a first beam 6 is formed for reception of transmitted data from a first subscriber module 2d in the MU-MIMO group on the basis of previously determined channel estimates. This is a beam with a peak typically pointing towards the subscriber module 2d, which would be formed if all of the capacity to form beam is used. If, as in the case shown in FIG. 3, it is determined that the MU-MIMO group has fewer members than a number of beams which the access point or wireless station, and in particular the beamforming weights matrix, is configured to receive, then one or more additional beams 10a, 10b, 10c, 10d may be formed within the capacity of the access point, and in particular the beamforming weights matrix, for reception of the transmitted data from the first subscriber module 2d. The additional beams 10a, 10b, 10c, 10d are each offset in azimuth by a respective pre-determined angle from the first beam 6. Typically the pre-determined angle may be less than the spacing between the MU-MIMO beams. For example, the spacing between the MU-MIMO beams may be 7 degrees, and the additional beams may be offset in increments of typically 1 degree. Other offsets may be chosen, for example offsets in increments of 2 degrees, or less than 2 degrees, for example between 1 degree and 2 degrees. In the example of FIG. 3, there is capacity to form 7 beams, but only three subscriber modules are in the MU-MIMO group as shown. The spare capacity to form and receive from 4 beams is used to form the four additional beams towards the first subscriber module 2d.

Figure 4:
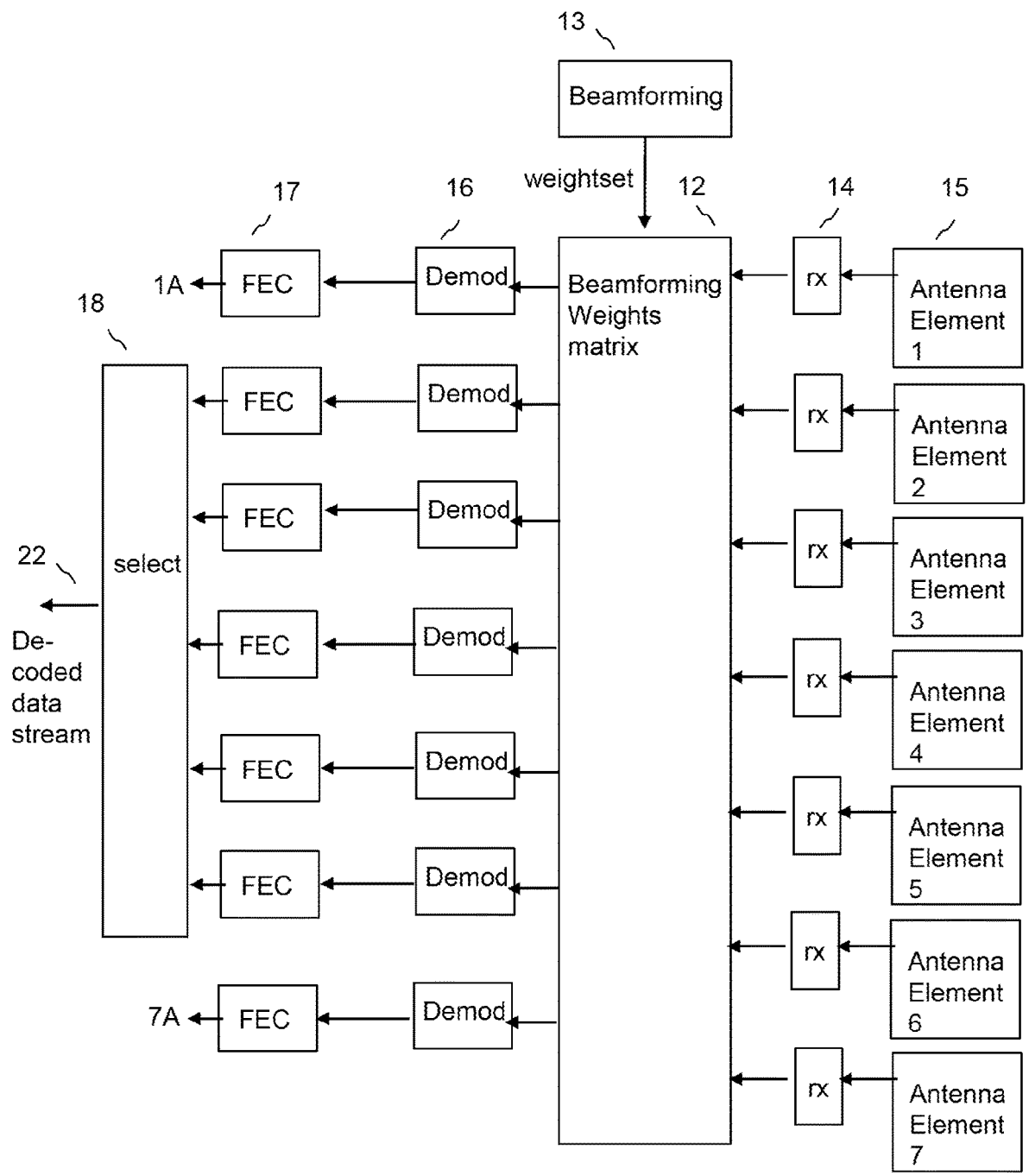
FIG. 4 shows an architecture according to an embodiment of the invention, with selection between data streams on the basis of forward error correction results, which may be on a symbol-by-symbol basis.

FIG. 4 shows an architecture according to an embodiment of the invention, with selection between data streams on the basis of forward error correction results, which may be on a symbol-by-symbol basis.

As shown in FIG. 4, a decoded data stream is generated, in this example by selection of the decoded, i.e. error corrected, outputs of the Forward Error Correction (FEC) circuits 17. The selection is between a data stream resulting from receipt of the transmitted data in the first beam and from respective data streams resulting from receipt of the transmitted data in the one or more additional beams.

The generation of additional beams offset from the first beam provides a variety of positions of nulls in the reception patterns, and so increases the probability of an interference source falling into a null on at least one of the beams. Generating the decoded data stream from the data streams from the first beam and the additional beams allows data to be selected from the stream with the best rejection of interference, which may change dynamically due to multiple sources of intermittent interference. Selection between beams may be performed more rapidly and with less signalling overhead than recalculation of a weightset to adjust a beam pattern. Typically a weightset may be re-calculated in a period of the order of seconds or minutes, whereas selection between beams may be, for example, every symbol, which may be every 12 microseconds or so. Therefore it can be seen that if the interference is dynamic, for example multiple intermittent sources in an unregulated band, embodiments of the present invention offer much faster and simpler response than re-calculation of weights.

As shown in FIG. 4, each of the data streams from the beamforming weights matrix is demodulated 16 and forward error correction 17 is applied to each of the data streams. The decoded data stream 22 is generated by combining sections of the respective data streams, each section for example corresponding to a received OFDM symbol. The sections may be selected on the basis of the forward error correction of the respective data stream. Typically, data may be selected from sections, typically corresponding to OFDM symbols, determined not to have uncorrected errors. This method is typically straightforward to implement because data determined not to have uncorrected errors may be taken from any of the data streams.

Figure 5:
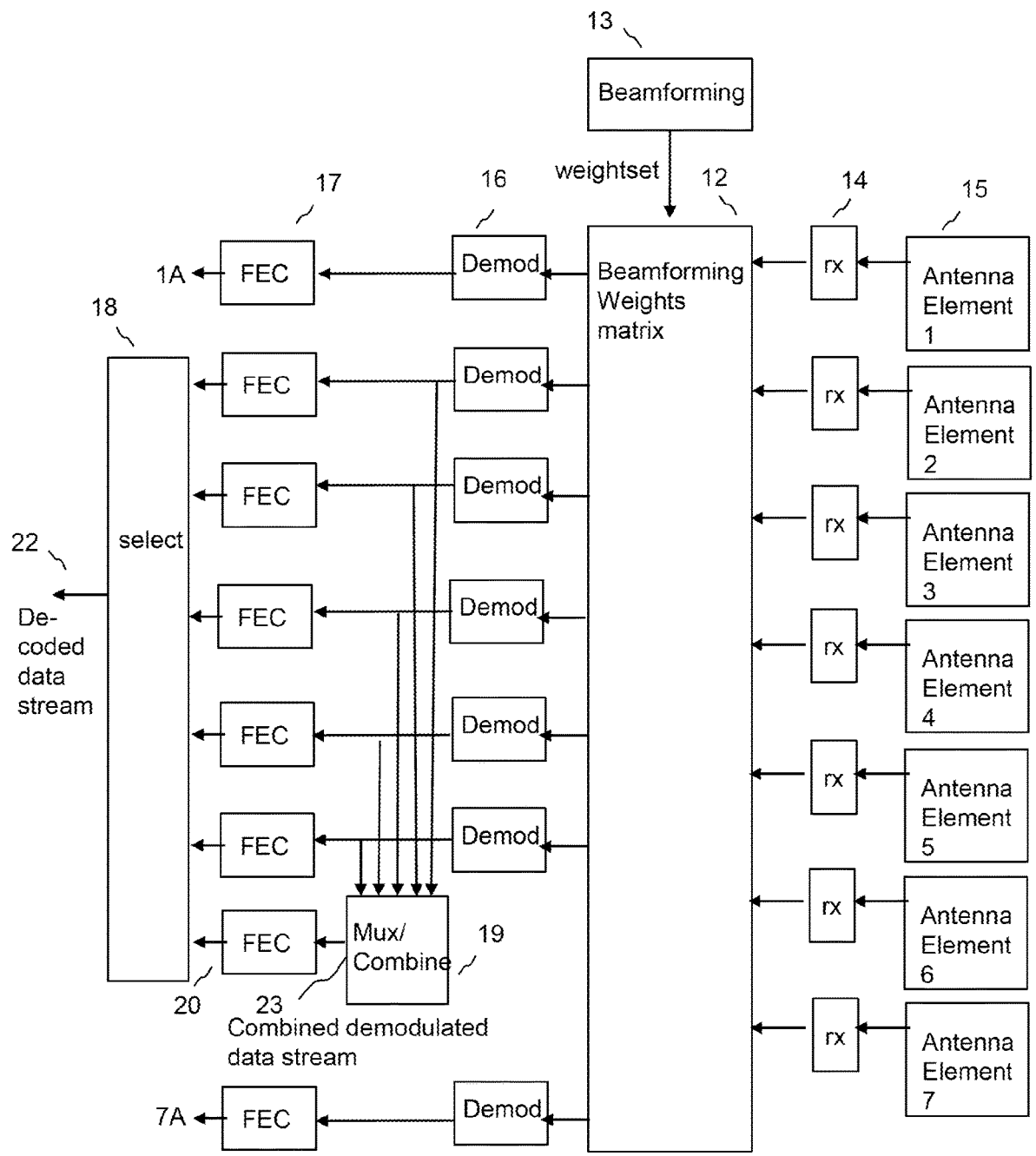
FIG. 5 shows an architecture according to an embodiment of the invention, in which a combined demodulated data stream is formed from the individual data streams from the received beams and selecting between this and the individual data streams on the basis of forward error correction results.

FIG. 5 shows an architecture according to an embodiment of the invention, in which a combined demodulated data stream 23 is formed from the individual data streams from the received beams. As shown, the combined demodulated data stream is passed to a forward error correction block 20, and the decoded and error corrected data stream is passed to a selecting block 18, to select the output to be used as the decoded data stream 22, the selection between this and the individual data streams being on the basis of forward error correction results of each beam. Generating the combined demodulated data stream provides a further source of demodulated data from which decoded data may be selected, which may provide better interference rejection than the additional beam alone, for example if an interference source falls between nulls of the additional beams or if the noise source is distributed in origin in azimuth angle.

As shown in FIG. 5, generating the combined demodulated data stream 23 may be performed by the Mux/combiner function 19. In an embodiment of the invention, each bit of the combined demodulated data stream 23 may be selected by comparison of the corresponding bit of each of the data steams to be combined, so that bits may be selected from different streams on a bit-by-bit basis. For example, each bit may be related to a respective sub-carrier of an OFDM symbol, at a different frequency, and so the origin of the interference may vary between bits, so this allows selection of a different reception pattern per bit to reject the respective interference. The selection of each bit of the combined data stream may comprise selecting a majority value for each bit, by comparing the values of the corresponding bits of each of the data steams to be combined. So, if for example a corresponding bit had the value "1" in four data demodulated data streams and "0" in one demodulated data stream, the majority value 1 would be chosen to be in the combined demodulated data stream, which would then be passed to the forward error correction function 20, which may then be working on an input stream with fewer errors to correct.

Alternatively, the mux/combiner function 19 may generate the combined demodulated data stream 23 by a process comprising weighting the respective corresponding bits of each of the data steams to be combined according to a respective quality metric. The quality metric may comprise, for example, a forward error correction error rate for the respective stream and/or a per tone vector error calculation. This may provide improved performance by allowing optimal combination of the streams.

Figure 6:
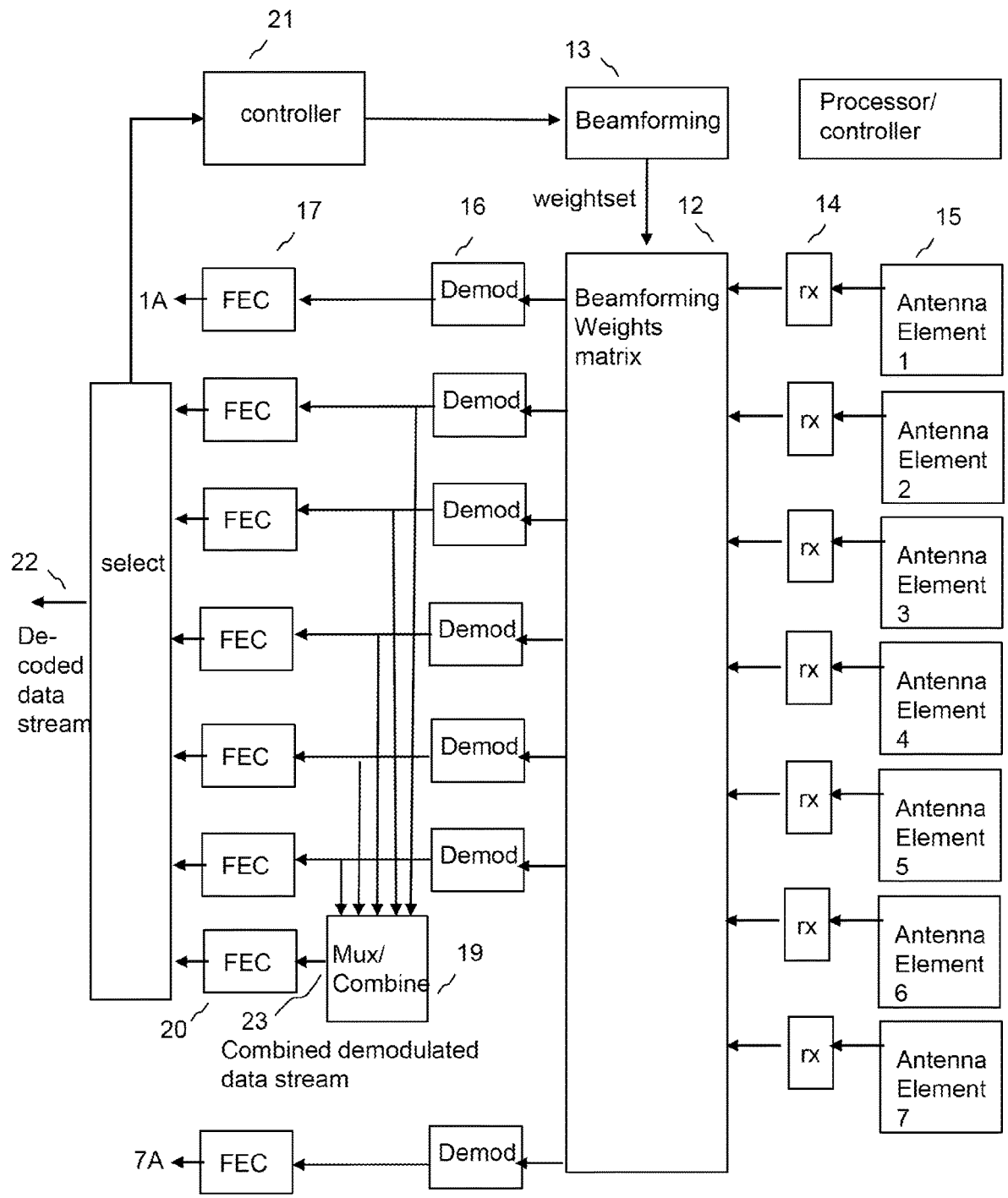
FIG. 6 shows an architecture according to an embodiment of the invention, showing a feedback path to adjust the beamforming weights to move a beam iteratively in azimuth on the basis of forward error correction or vector error results.

FIG. 6 shows an architecture according to an embodiment of the invention, showing a feedback path, using a controller 21, to adjust the beamforming weights to move a beam iteratively in azimuth on the basis of forward error correction or vector error results. The controller may be a function performed by a digital processor at the access point, which may typically be configured to cause the access point to operate according to the method of embodiments of the invention. A selected one of the additional beams may be adjusted in steps away from the respective predetermined angle on the basis of a measure of quality of the data stream received in the selected beam. The measure of quality of the data stream received in the selected beam may comprise an aggregate vector error for a received symbol, or for example an error rate from a forward error correction decoder. This may provide a further improvement by allowing adjustment of the position of the nulls of one or more of the additional beams to better coincide with the long-term position of an interference source.

In an embodiment of the invention, the selected beam is a beam selected on the basis of having a low measure of quality of the data stream received in the beam when offset from the first beam by the respective predetermined angle. This allows the beam with the worst rejection of interference to be iteratively adjusted to a position with better rejection of interference, so that then a further beam may be selected for adjustment of position.

Figure 7:
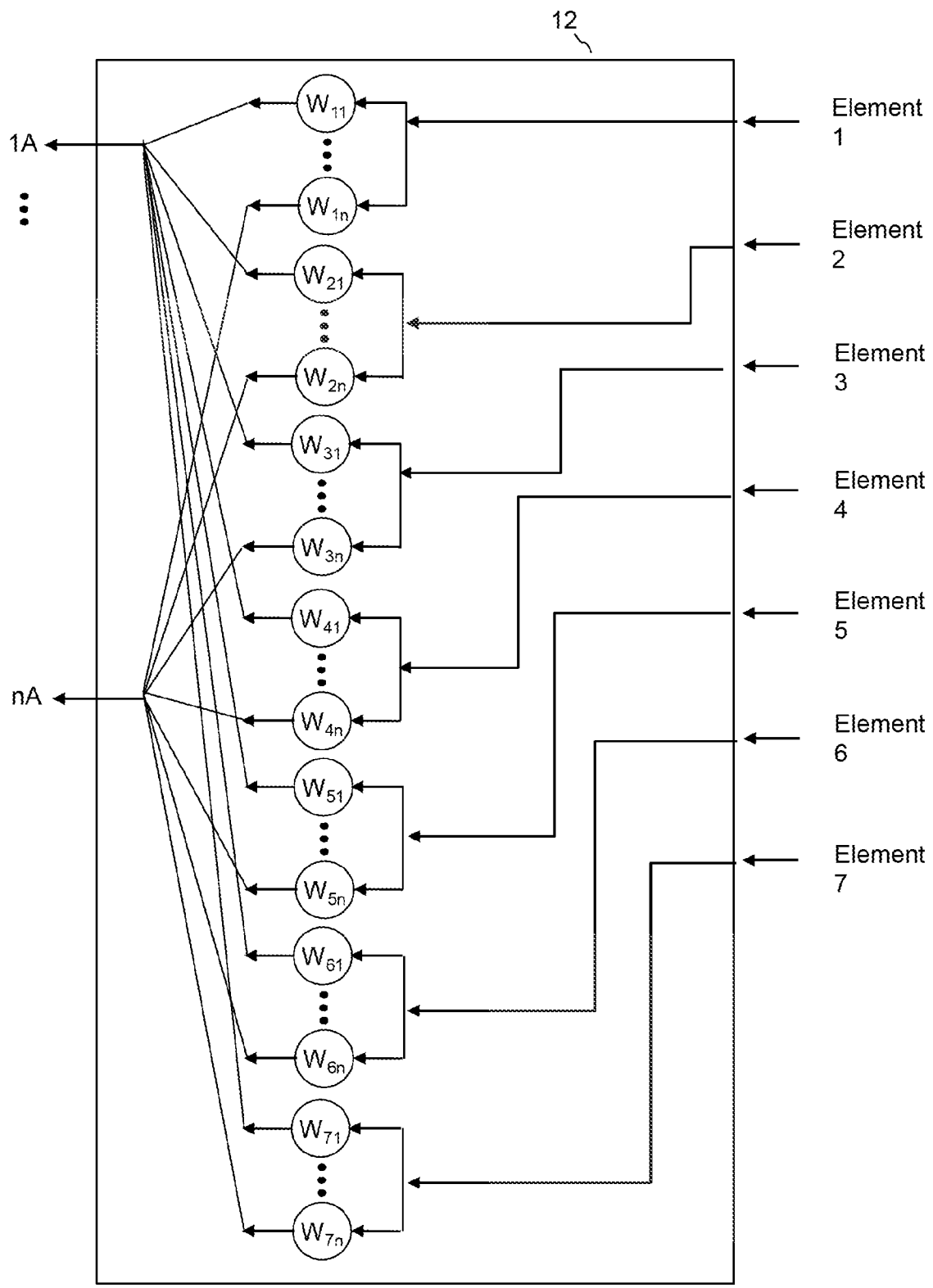
FIG. 7 is a schematic diagram showing a beamforming weights matrix.

FIG. 7 shows an example of a beamforming weights matrix 12. As shown in FIG. 7, an input from each antenna element, received via a respective receive chain to convert to a stream of OFDM tone values, is weighted and combined with weighted tone values form the other elements produce a respective beam output 1A to nA. To form a first beam 1A, the stream of OFDM tone values received from each antenna element is weighted, in this example, by a respective weighting value W11-W71, and the weighted streams are combined. Similarly, to form a beam nA, the stream of OFDM tone values received from each antenna element is weighted by a respective weighting value W1n-W7n, and the weighted tones are combined. The number of beams that may be formed is typically limited by the number of weighting values that may be applied by the beamforming weights matrix and also by the number of output channels provided.

Figure 8:
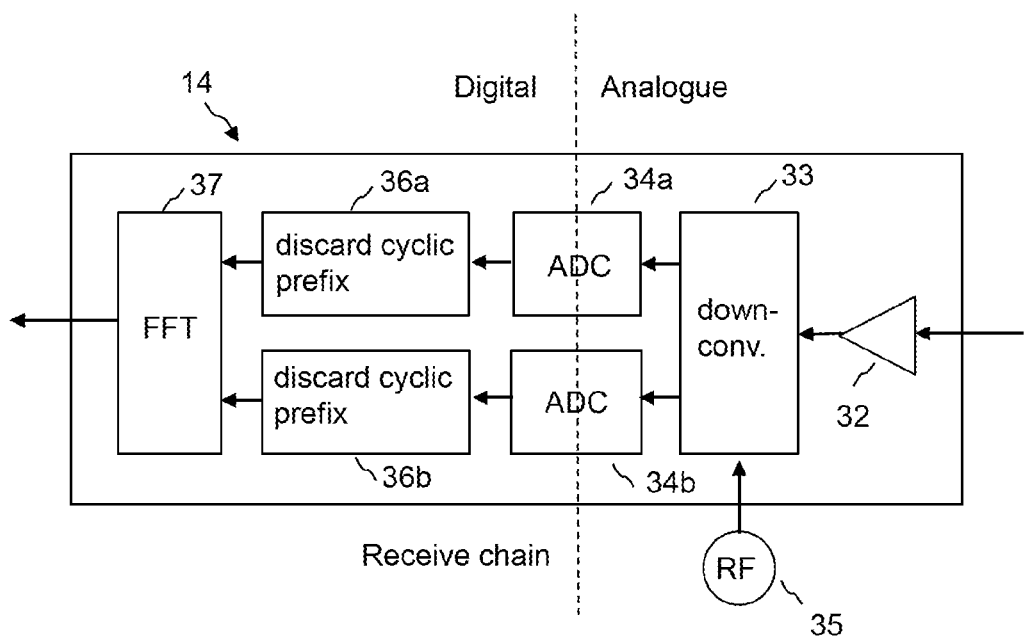
FIG. 8 is a schematic diagram showing a receive chain.

FIG. 8 is a block diagram showing an example of the components of a typical receive chain 14. A signal is received from an antenna element at radio frequency, that is to say carrier frequency, by low noise amplifier 32. This is downconverted, typically to baseband, in Inphase (I) and Quadrature (Q) components, by downconverter 33 which is supplied with a local oscillator by an RF generator 35. The I and Q components are digitised in the analogue to digital converters 34a, 34b, and the cyclic prefix of the OFDM symbol is typically discarded 36a, 36b. The OFDM symbol is then converted from the time domain to a series of OFDM tones, each representing the amplitude and phase of one of the sub-carriers, by the Fast Fourier Transform 37. The series of OFDM tones, typically in I and Q form, is then fed to the beamforming weights matrix to be formed into beam outputs 1A to 1n.

Figure 9:
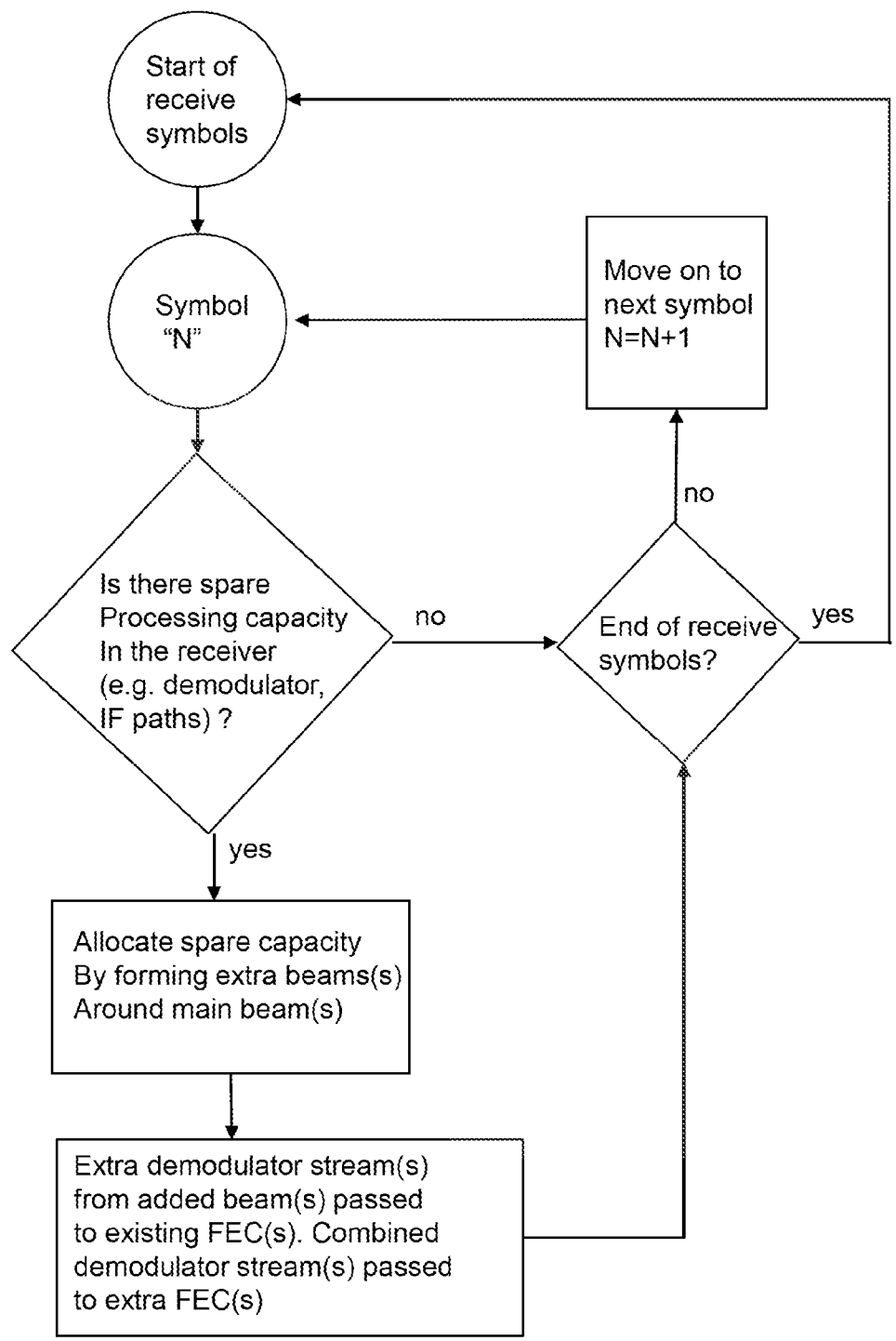
FIG. 9 is a flow diagram of a method according to an embodiment of the invention, showing allocation of additional beams in the case of spare beam capacity, on a symbol-by-symbol basis.

FIG. 9 is a flow diagram of a method according to an embodiment of the invention, showing allocation of additional beams in the case of spare beam capacity, on a symbol-by-symbol basis.

Figure 10:
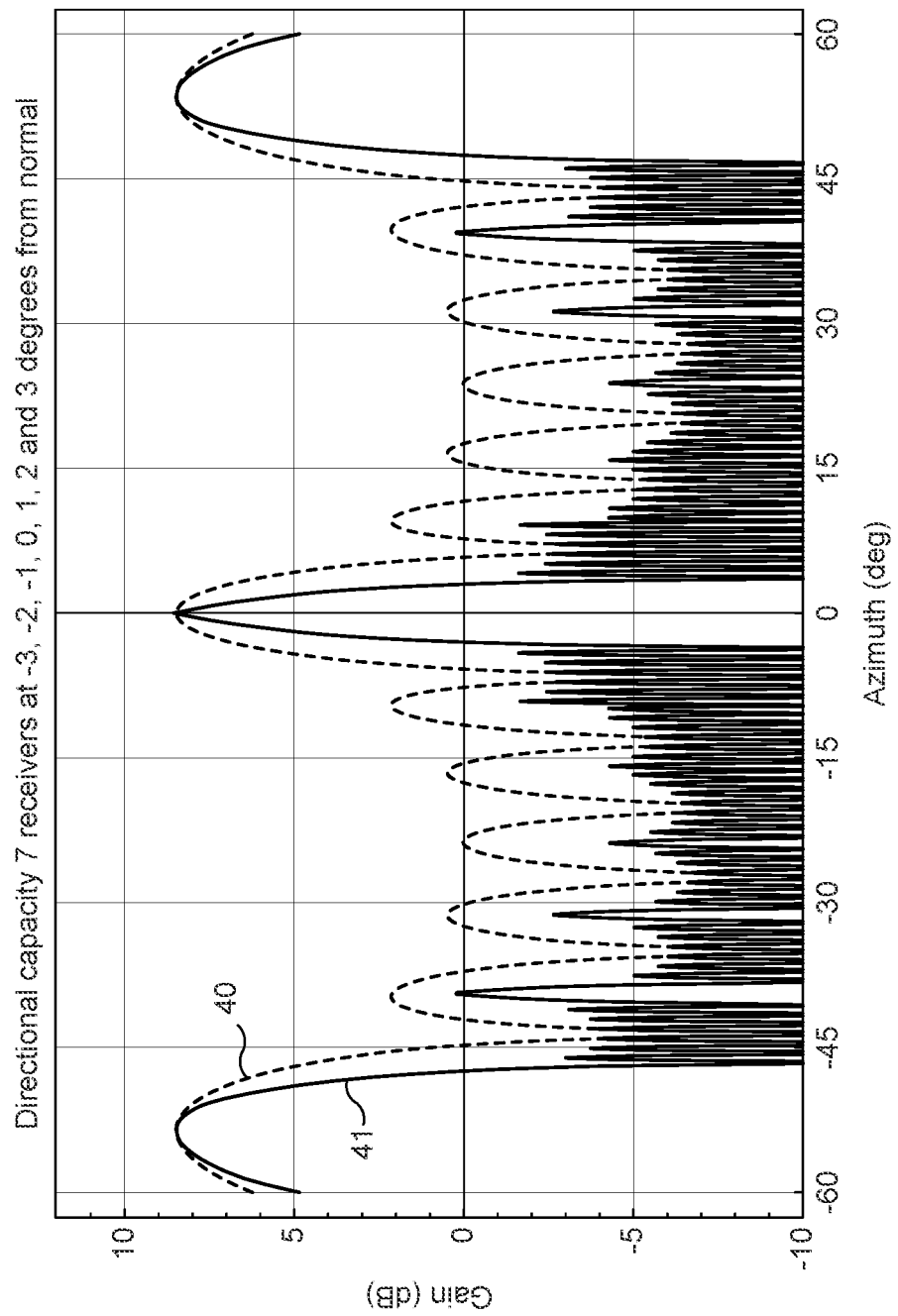
FIG. 10 shows interference rejection as a function of azimuth angle for a system having additional beams according to an embodiment of the invention in comparison with interference rejection for a single MU-MIMO beam.

FIG. 10 shows interference rejection as a function of azimuth angle for an interference mitigation system having additional beams according to an embodiment of the invention, as curve 41, in comparison with interference rejection for a single MU-MIMO beam, as curve 40. The interference mitigation system in this example forms 7 beams, being the "first" beam formed towards the subscriber module from which data is being received on the basis of channel sounding, at a nominal 0 degrees, and 6 additional beams, using spare capacity in the beamforming weights matrix, at nominal azimuth angles of −3, −2. −1. 1, 2 and 3 degrees. The best of the seven beams is selected for reception, in terms of greatest rejection of noise, as a noise, i.e. interference, source is swept in azimuth angle from −60 degrees to +60 degrees. The vertical scale shows the gain towards the noise source at each angle of arrival. It can be seen that the noise rejection is improved at most angles of arrival, compared with the sensitivity to noise in a single beam, as shown by curve 20. In the example of FIG. 10, each beam has a sinc, i.e. (sin x)/x beam shape, the beam shape representing receive gain against an angle of arrival, x, in azimuth and/or elevation. In the case that the antenna array is an array of antenna elements arranged in a horizontal line, and the beam pattern is in azimuth. A typical spacing between antenna elements is half a wavelength at an operating frequency of the antenna. A sinc beam shape is a well known case, typically having a first sidelobe at a level of −13 dB compared to the gain in the centre of the main beam. A sync beam shape may be formed from a uniform amplitude excitation across the array and gives good receive gain. For example, for a seven element array, a sync beam shape centred on boresight, i.e. 0 degrees azimuth, may be formed from a weight set {(1, 0), (1, 0), (1, 0), (1, 0), (1, 0), (1, 0), (1, 0)}, representing the real and imaginary weights applied to signals on each antenna element respectively. The weighted receive signals are combined to produce the respective beam. To offset the beam from 0 degrees azimuth, a phase slope can be applied to the weights across the array in a well-known manner.

Figure 11:
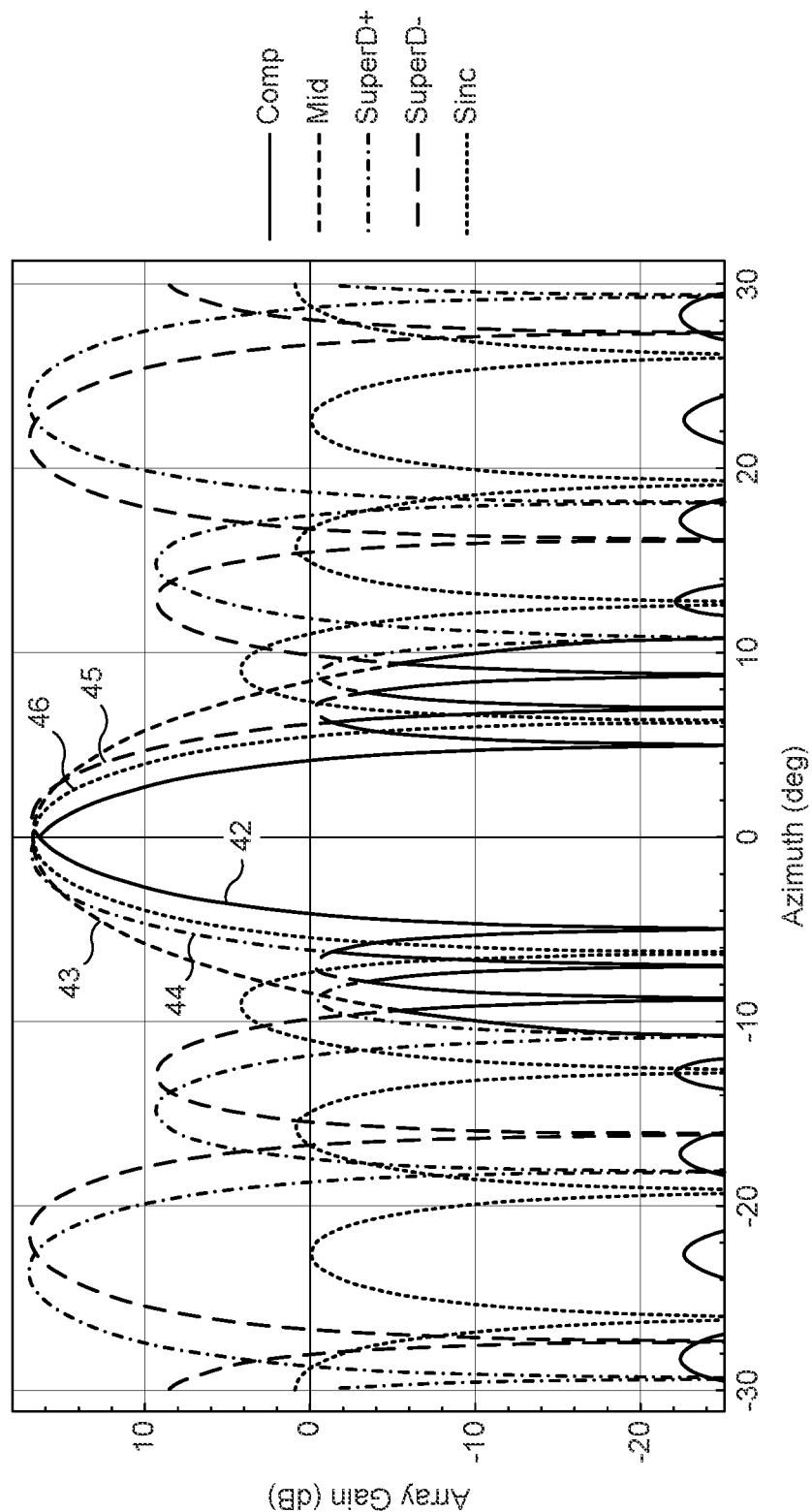
FIG. 11 shows beam shapes and combined interference rejection in an embodiment of the invention.

FIG. 11 shows the use of alternative beam shapes, in which the first beam has a different beam shape from the beam shapes of the additional beams. This allows different spatial filter characteristics for each beam so that in a combined detector there is a very low likelihood of interference being at a high level in all of them. The beam shapes may be chosen so that at least one of them has a low gain at each angle of arrival of interest.

In the example of FIG. 11, the main beam 43 ("Mid") has a broad main lobe and low sidelobe levels, and is formed by a beam having a weightset {(0.289952, 0), (0.853548, 0), (1.47878, 0), (1.75543, 0), (1.47878, 0), (0.853548, 0), (0.289952, 0)}. To offset the beam from 0 degrees azimuth, a phase slope can be applied to the weights across the array. There are two additional beams 44, 45 in this example, "Super D+" and "Super D−". The "Super D+" beam 44 is offset in azimuth by −1 degrees in this example, and the "Super D−" beam 45 is offset in azimuth by +1 degree. The weightset used in this example to form the additional beams is {(1.76866, 0), (−0.315833, 0), (1.76005, 0), (0.574241, 0), (1.76005, 0), (−0.315833, 0), (1.76866, 0)}, offset by applying an appropriate respective phase slope.

As may be seen from FIG. 11, the first beam has a beam shape having different side lobe levels from the side lobe levels of the respective beam shapes of the additional beams. The shape for the first "Mid" beam has a broader main lobe, and lower sidelobes, than the corresponding lobes for the additional "Super D+" or "Super D−" beams.

FIG. 11 shows that, at least one of the additional beams, and in this example two additional beams 44, 45, ("Super D+" and "Super D−"), have lower gain in the first sidelobes than the gain of the corresponding sidelobes in a sinc beam pattern 46. In FIG. 11, the sinc pattern 46 is shown only for comparison purposes with the other beam shapes, but is not used in the system being illustrated. However, in alternative embodiments, at least one beam shape could be a sinc pattern.

As also shown in FIG. 11, the first beam shape 43 ("Mid") has lower gain in at least the second sidelobes, than the gain of the corresponding sidelobes in a sinc beam pattern.

So, FIG. 11 illustrates a composite curve, the unbroken "Comp" line 42, which shows receive gain that results by selecting the beam having the lowest gain for reception at each angle of arrival (shown here as azimuth), and the composite curve, the, shows the gain at each angle given this selection. This may be taken as the gain to an interference source at each angle of arrival. The selection may be performed, in effect, by selection of a symbol or part of a symbol from a respective beam on the basis of a measure of quality, such as a detected error rate before error correction, or a vector error in a demodulated signal from a beam, that is related to an interference level. There may be a slight reduction in the gain to the wanted signal when one of the offset additional beams is selected, but this is typically a small effect and is more than compensated for by the reduction in gain to the interference source. Accordingly, the assumption that the beam with the lowest gain to interference is selected is a useful approximation to the result of the data selection process.

Referring to FIG. 11, and tracing the composite "Comp" plot in a direction of increasing azimuth angle from the 0 azimuth direction, which corresponds to the direction to the wireless station or subscriber module from which it is intended to receive a wanted signal, the selection of the lowest gain, i.e. lowest interference at a given angle, leads first to the selection of the additional beam 44, "Super D+", which is offset by −1 degree. This provides a lower gain than the other additional beam 45, "Super D−", because of the offset. Moving further from the 0 azimuth direction, the selection changes to the other additional beam 45, "Super D−", because its first null becomes available and, by selection of the other additional beam, good rejection of interference is obtained. Further from the 0 azimuth position, the selection moves back to the additional beam 44, "Super D+", taking advantage of the reduced sidelobe level. Further out, the first beam shape 43 is selected, as shown by the solid line, taking advantage of the reduced second, and potentially third, fourth, and other, sidelobes. This allows improved rejection of interference at angles of arrival between nulls in the beams, because of the reduced sidelobe levels between the nulls.

A skilled person would understand that the shape of a beam and the sidelobe levels may be selected by varying the weights used in the weightset to generate the beam applied to the beamforming weights matrix for the respective beam. Various beam shapes and respective weightsets are known in the art. In the example of FIG. 11, there is one main beam shown, "Mid", 43, centred on 0 azimuth, which is taken as the direction of the wanted signal in this example. The wanted signal could be from other angles of arrival, in which case the centre of the main beam would be offset by an appropriate angle. Two additional beams are shown 44, 45, which are offset by −1 and 1 degree respectively. The additional beams may be what are known in the art as super-directive beams.

Figure 12:
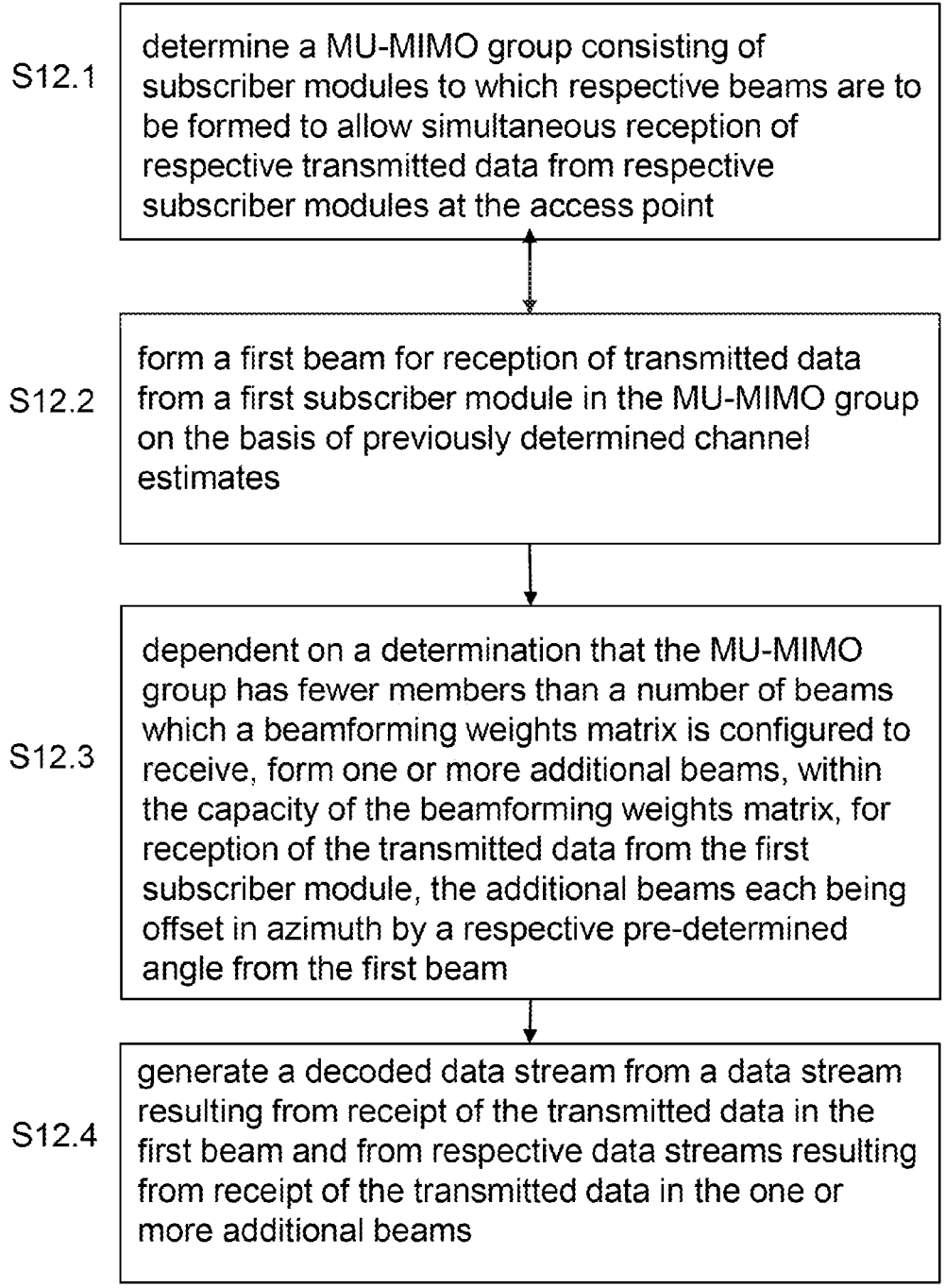
FIG. 12 is a flow diagram of a method according to an embodiment of the invention, in which a combined, decoded data stream is generated from the data streams from the received beams.

FIG. 12 is a flow diagram of a method according to an embodiment of the invention, in which a combined, decoded data stream is generated from the data streams from the received beams, according to steps S12.1 to S12.4.

Figure 13:
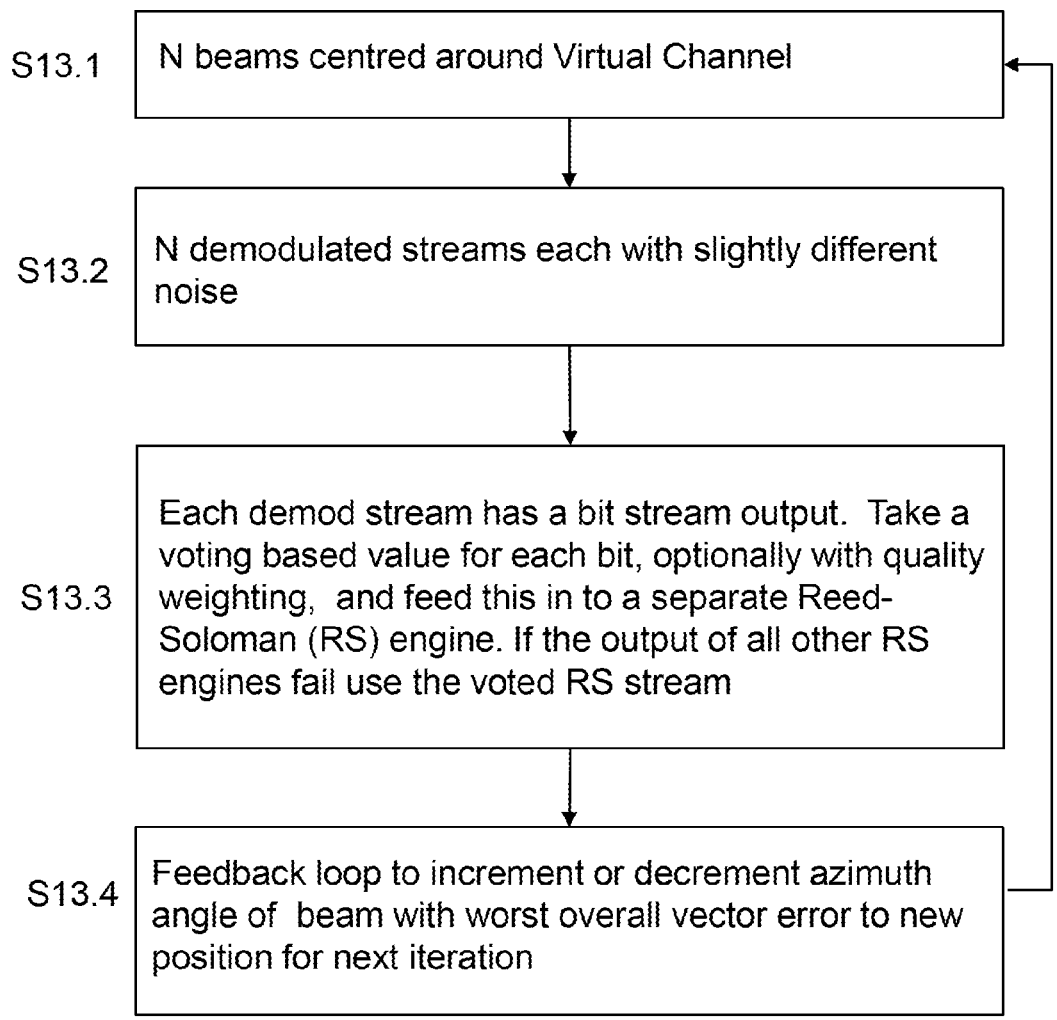
FIG. 13 is a flow diagram of a method according to an embodiment of the invention, in which a feedback loop is provided to adjust the position of a beam in azimuth.

FIG. 13 is a flow diagram of a method according to an embodiment of the invention, in which a feedback loop is provided to adjust the position of a beam in azimuth, as illustrated also in FIG. 6. A virtual channel, as mentioned in FIG. 13, is a MU-MIMO beam, in this case the "first" beam, formed on the basis of a channel estimate. Step S13.3 relates to the operation of the Mux/combiner 19 of FIG. 6, operating to select bits according to a quality weighting, which feeds into forward error correction function 20, in this example specified as a Reed-Solomon engine, and then into the selector to form the decoded data stream 22. At step S13.4, the beam position of the beam with the worst vector error is iteratively adjusted.

Figure 14:
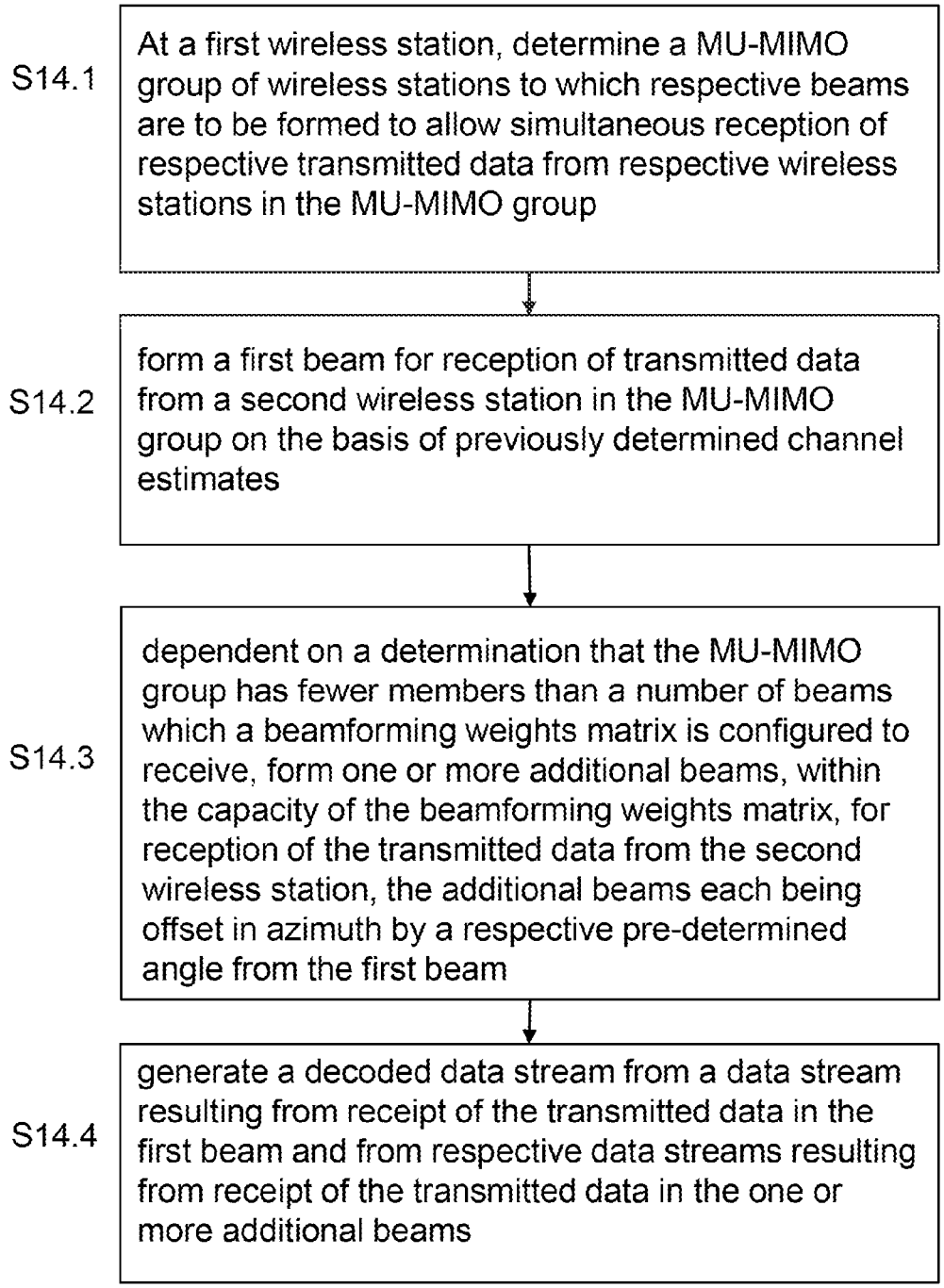
FIG. 14 is a further flow diagram of a method according to an embodiment of the invention.

FIG. 14 is a further flow diagram of a method according to an embodiment of the invention, referring to first and further wireless stations instead of specifically an access point and subscriber modules, according to steps S14.1 to S14.4.

In embodiments of the invention, the wireless communication system may be a time division duplex system, so that downlink signals transmitted from an access point and uplink signals transmitted from a subscriber module are transmitted at the same frequency. Alternating fixed-duration time periods, may be allocated for uplink and downlink transmission respectively. An uplink and a downlink frame may form a time division duplex frame, which is typically divided into timeslots, each timeslot typically being for communication with a subscriber module, or in the case of MU-MIMO operation, with a group of subscriber modules. The access point may switch from one mode of operation to another between timeslots, for example from sector mode to MU-MIMO mode. Transmission of sounding symbols, for the purposes of channel sounding for forming MU-MIMO beams, may be performed within a timeslot.

It will be understood that the method of embodiments of the invention may be implemented by an electronic system comprising one or more processors, which may comprise program code held in a memory configured to cause the processor to perform the method. The processor or processors may comprise one or more digital signal processors, and/or programmable logic arrays.

Returning to FIG. 1, the subscriber modules 2a to 2g may have antennas which have an aperture defined for example by a reflector, and each antenna element may comprise a probe for receiving and/or transmitting a respective polarisation from/to the aperture. The antenna is typically installed so as to align the peak of the transmit/receive radiation pattern in the direction of the access point 1, which is typically installed on a tower. A command sent to each subscriber module may comprise a map indicating a scheduling of radio resource and/or polarisation to the subscriber module as a function of time. The map may indicate respective allocations to several subscriber units as a function of time, typically all subscriber units served by an access point. The map may indicate, for example, time, polarisation, and/or frequency allocation for transmission and/or reception. The scheduling of radio resource and polarisation may be updated periodically, the period between updates being determined by a scheduler at the access point.

A specific example of an access point according to an embodiment of the invention is given by a point-to-multipoint (PMP) Access Point (AP) with a seven-element dual-polarised adaptive array smart antenna and multi-user MIMO (MU-MIMO) capabilities. It will be understood that embodiments of the invention are not limited to this example. The access point in this example is designed for outdoor deployment as an AP with sector coverage in a PMP network. Units may be deployed in multiples to provide 360° coverage from a tower or rooftop. The access point may be a complete radio transceiver operating in the frequency range 5150 MHz to 5925 MHz, using Time Division Duplex (TDD) separation of the uplink and downlink directions.

The access point may include an integrated dual-polarised seven-element adaptive array smart antenna. Seven identical dual-polarised antenna elements and 14 associated transceiver chains may be contained within a single rigid assembly, with each antenna element connected directly to two transceiver chains using printed conductors and wireless via connections. The integration of the components ensures that the spacing and alignment of the antenna elements is known and constant.

Each antenna element may consist of a vertical column of eight radiating patches and separate passive feed networks for horizontal and vertical polarisations. A single element may have a relatively narrow beamwidth (about 8°) in the elevation direction, and a broader beamwidth (about 80°) in the azimuth direction. The gain of each antenna element (that is to say, each column of eight patches) is about 14 dBi. The overall antenna assembly may contain 56 patches, in an array that is seven elements (seven patches) wide and one element (eight patches) high.

In this example, the maximum output power of a single transmitter chain is about 10 dBm, or 13 dBm for each dual-polarised pair of chains The associated Subscriber Module (SM) devices may contain a directional dual-polarised antenna with two transceiver chains. The SMs may support a single data stream using polarisation diversity or polarisation multiplexing. In MU-MIMO operation, the AP may support several, for example seven, parallel data streams, where each stream is associated with a different SM device.

Application firmware in the access point may compute the transmitter gain, and amplitude and phase weights for the combining matrix, to provide the required MU-MIMO beam patterns. This operation may be based on an accurate model of smart antenna operation, in which the resultant signal strength at any azimuth angle is determined as the superposition of the signals radiated by the individual antenna elements. This model may automatically and intrinsically allow for array gain in the smart antenna.

The beamforming weights matrix may be implemented using a programmable gate array or by programming a digital signal processor, or by other well-known digital signal processing implementation techniques.

So, in embodiments of the invention a MU-MIMO system may have the ability to receive, demodulate and decode multiple data streams in parallel. The ability to do this may involve steering an RF beam at the sources of transmitted data. To mitigate the detrimental effects of other transmitters, which may appear as noise, i.e interference, being received, in embodiments of the invention, when all beams are not fully utilised, then spare beams may be used to improve the system tolerance to any noise or interference. The main beam of an antenna, RF chain and demodulator may be orientated towards the transmitter source. From zero to 'N' additional beams may be oriented also towards this same source but with a variable offset from it. The number of additional beams may be varied with spare capacity on the MU-MIMO system. The demodulators associated with the additional beams may attempt to demodulate the same signal as the main beam, so that there may be 'N+1' demodulated streams available for independent decoding and error correction. In an embodiment of the invention, there is provided a system of multiplexing/combining the output of the available demodulators to provide an additional stream or streams for the error correction algorithm to work on, where additional FEC blocks may be added as required. Examples of multiplexing/combining the outputs may include a weighted voting stream where each bit of data passed to an additional error correction block and is voted for based on the output of the N+1 demodulators. E.g. in the case where N+1 is odd and with equal weights it is a simple majority vote over the N+1 streams of whether a bit should be '1' or '0' to be passed to an additional FEC. The methodology and system for utilisation of the spare capacity and optimising data throughput may comprise selection of the number and direction of additional beams, weighting and method of combining multiple streams to additional FEC components, and a feedback system to continually optimise the selection of the number and direction of additional beams, and the weighting and method of combining multiple streams to additional FEC components.

In an embodiment of the invention, the main beam may be optimised to point towards the transmitter. This beam may have the highest signal strength. Additional beams may be steered to the side of the main beam and therefore have slightly lower signal strength. A beam may have side lobes and a varying level of noise rejection. i.e. nulls, varying with the azimuth angle away from the centre at zero degrees. The pattern of available beams with each additional beam added being offset from the centre of the main beam allows makes it more likely a noise source will fall in a null for one or more of the beams. If the noise source sits in a deep null then the demodulated stream will likely not contain errors introduced from the noise source and will pass the FEC to deliver the correct data that was transmitted. An example of noise rejection when using several beams compared to a single beam is given in FIG. 10. It can be seen that the single beam 40 is much more likely to see a higher noise level from an interferer at an unknown azimuth position. If the position in azimuth of the interference is known it is possible to drive a null to that position directly. If the noise source does not sit directly within a null of a demodulator or if it is of a broader origin, rather than a point source, then the process of combining several demodulator streams to form an optimised stream to a new FEC will further reduce the impact of the noise source, improving the probability of the correct reception of the transmitted data. A noise source received on a number of beams will have a different impact on how each demodulator determines the original transmitted data. For example in a QPSK system each demodulator slicing decision to determine a data tone value will be influenced by the noise. As there is a distribution of nulls across the demodulators then it is unlikely all will be affected so that the noise causes the QPSK slice determination to be made in error in all of them on the same data tone. Therefore a combining/voting system may provide a best output stream even if the errored demodulator changes from data point to data point. Analysis and feedback mechanisms can provide an optimal way to combine the outputs of the demodulators to a FEC so that the original transmitted data is recovered. Metrics for determining a weighting scheme for the demodulator combining may include FEC error rate calculation or per tone vector error calculations. Simulations of combining schemes show a possible 2-3 dB improvement over the individual beam case with various scenarios of wanted and noise sources.

In an embodiment of the invention, data loss may be minimised in an RF system by utilising the spare capacity of a MU-MIMO system, where the spare capacity is available when every possible MU-MIMO receive stream is not receiving data from an independent source. In addition to a main beam directed towards the transmission source, additional beams may be directed in that direction with an offset. The offset may be fixed or adjusted to optimise the probability of the received data being correctly received without error. All beams may be independently demodulated and their output directed to a forward error correction function (FEC). An additional stream or streams may formed from the combined outputs and fed to additional FEC or FECs. There may be a weighting scheme for the combination method to the additional FEC or FECs, which may be fixed or dynamic, e.g varying symbol-to-symbol. The scheme may be based on locally available data at the demodulator level or an additional system of metric based optimisation, or a combination of these.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of interference mitigation for a multi user multiple input multiple output MU-MIMO wireless communication network comprising a first wireless station and a plurality of further wireless stations, comprising:
   determining a MU-MIMO group of the further wireless stations to which respective beams are to be formed to allow simultaneous reception of respective transmitted data from respective further wireless stations in the MU-MIMO group at the first wireless station;
   forming a first beam for reception of transmitted data from a second wireless station, the second wireless station being one of the further wireless station in the MU-MIMO group, on the basis of previously determined channel estimates;
   dependent on a determination that the MU-MIMO group has fewer members than a number of beams which a beamforming weights matrix is configured to receive, forming one or more additional beams, within the capacity of the beamforming weights matrix, for reception of the transmitted data from the second wireless station, the additional beams each being offset in angle of arrival by a respective pre-determined angle from the first beam; and
   generating a decoded data stream from a data stream resulting from receipt of the transmitted data in the first beam and from respective data streams resulting from receipt of the transmitted data from the one or more additional beams.

2. A method according to claim 1, wherein generating the decoded data stream comprises:
   demodulating and applying forward error correction to each of the data streams; and
   generating the decoded data stream by combining sections of the respective data streams selected on the basis of the forward error correction of the respective data stream.

3. A method according to claim 2, wherein generating the decoded data stream comprises combining sections of respective data streams by selecting data from sections determined not to have uncorrected errors.

4. A method according to claim 3, wherein selecting data determined not to have uncorrected errors comprises selecting OFDM symbols determined not to have uncorrected errors.

5. A method according to claim 2, comprising:
generating a combined demodulated data stream from the data streams;
applying forward error correction to the combined demodulated data stream; and
generating the decoded data stream on the basis of the forward error correction of the data stream received in the first beam, the forward error correction of the data streams received in the one or more beams, and the forward error correction of the combined demodulated data stream.

6. A method according to claim 5, wherein generating the combined demodulated data stream comprises:
selecting each bit of the combined demodulated data stream by comparison of the corresponding bit of each of the data steams to be combined.

7. A method according to claim 6, wherein selecting each bit of the combined data stream comprises selecting a majority value for each bit of the values of the corresponding bits of each of the data steams to be combined.

8. A method according to claim 5, wherein generating the combined demodulated data stream comprises:
weighting the respective corresponding bits of each of the data steams to be combined according to a respective quality metric.

9. A method according to claim 8, wherein the quality metric comprises a forward error correction error rate for the respective stream.

10. A method according to claim 8, wherein the quality metric comprises a per tone vector error calculation.

11. A method according to claim 1, comprising iteratively adjusting the offset in angle of arrival of a selected one of the additional beams away from the respective predetermined angle on the basis of a measure of quality of the data stream received in the selected beam.

12. A method according to claim 11, wherein the measure of quality of the data stream received in the selected beam comprises an aggregate vector error for a received symbol.

13. A method according to claim 11, wherein the measure of quality of the data stream received in the selected beam comprises a error rate from a forward error correction decoder.

14. A method according to claim 11, wherein the selected beam is a beam selected on the basis of having a low measure of quality of the data stream received in the beam when offset from the first beam by the respective predetermined angle.

15. A method according to claim 1, wherein the first beam and each additional beam have respective sinc beam shapes.

16. A method according to claim 1, wherein the first beam has a beam shape having different side lobe levels from the side lobe levels of the respective beam shapes of the additional beams.

17. A method according to claim 16, wherein at least one of the additional beams has lower gain in the first sidelobes than the gain of the corresponding sidelobes in a sinc beam shape.

18. A method according to claim 16, wherein the first beam has a beam shape having lower gain in at least the second sidelobes, than the gain of the corresponding sidelobes in a sinc beam pattern.

19. A method according to claim 1, wherein the first wireless station and the further wireless stations are in a peer-to-peer mesh MU-MIMO wireless communication network.

20. A first wireless station for a multi user multiple input multiple output MU-MIMO wireless communication network comprising the first wireless station and a plurality of further wireless stations, the first wireless station comprising a processor configured to cause the first wireless station to:
determine a MU-MIMO group of the further wireless stations to which respective beams are to be formed to allow simultaneous reception of respective data streams from respective further wireless stations in the MU-MIMO group at the first wireless station;
cause a beamforming weights matrix to form a first beam for reception of a data stream from a second wireless station, the second wireless station being one of the further wireless stations in the MU-MIMO group, on the basis of previously determined channel estimates;
dependent on a determination that the MU-MIMO group has fewer members than a number of beams which a beamforming weights matrix is configured to receive, to cause a beamforming weights matrix to form one or more additional beams for reception of the transmitted data from the second wireless station, the additional beams each being offset in angle of arrival by a respective pre-determined angle from the first beam; and
to generate a decoded data stream from a data stream resulting from receipt of the transmitted data in the first beam and from respective data streams resulting from receipt of the transmitted data in the one or more additional beams.

* * * * *